United States Patent [19]

Takemura

[11] 4,287,457

[45] Sep. 1, 1981

[54] ELECTROMAGNETIC ROTATING APPARATUS

[75] Inventor: Yoshihiro Takemura, Ijima, Japan

[73] Assignee: Shinano Tokki Corporation, Japan

[21] Appl. No.: 907,907

[22] Filed: May 22, 1978

[30] Foreign Application Priority Data

Aug. 20, 1977 [JP] Japan ................................. 52/99726

[51] Int. Cl.³ .......................................... H02K 33/00
[52] U.S. Cl. ..................................... 318/133; 310/36; 318/132
[58] Field of Search .................................. 310/36–39; 318/119–133, 134

[56] References Cited

U.S. PATENT DOCUMENTS

| 2,815,477 | 12/1957 | Dunn et al. | 318/132 X |
| 2,946,940 | 7/1960 | Beyner et al. | 318/128 |
| 3,309,590 | 3/1967 | Reich | 318/132 X |
| 3,500,080 | 3/1970 | Bey | 310/36 X |

Primary Examiner—Donovan F. Duggan
Attorney, Agent, or Firm—Woodling, Krost & Rust

[57] ABSTRACT

An oscillating motor capable of 180° displacement and return without return springs.

16 Claims, 22 Drawing Figures

ELECTROMAGNETIC ROTATING APPARATUS

DETAILED DESCRIPTION OF THE INVENTION

This invention relates to a rotary solenoid or similar electromagnetic rotating apparatus that is capable of smoothly rotating through an angular range of approximately 180 degrees, in both directions, without employing a return spring or other like means.

Conventional rotary solenoids are broadly classified into two categories; one that converts axial motion produced by electromagnetic attraction into rotary motion by use of a mechanical transforming mechanism utilizing an inclined groove and a ball, and the other that directly rotates a rotor of soft magnetic material by means of an electromagnet. Regardless of this difference, however, the conventional rotary solenoids are attracted or rotate only in a direction in which magnetic reluctance reduces, because their moving members are made of soft magnetic material. Therefore, they require a return spring or other similar means to bring them back to the original position when not in operation. It is of course possible to constitute a bi-directionally rotating system by combining two solenoids of uni-directional torque type, disposed opposite to each other. In principle, however, this system does not differ from the uni-directional solenoid. In addition, the angular range of rotation of the conventional rotary solenoids has been limited to approximately 90 degrees because of their design concepts. Furthermore, sudden attraction caused by such solenoids has produced a crashing noise offensive to the ear.

An object of this invention is to provide a rotary solenoid or similar electromagnetic rotating apparatus that is rotatable in both directions through an angular range of approximately 180 degrees.

Another object of this invention is to provide a rotary solenoid or similar electromagnetic rotating apparatus that permits shortening the rotating time and, at the same time, reducing the crashing sound or vibration that arises on stopping.

To achieve the afore-mentioned objects, electromagnetic rotating apparatus according to this invention comprises a rotating shaft, a bipolar permanent magnet fixed to said rotating shaft and magnetized to produce magnetic flux perpendicular to the axis of said rotating shaft, a fixed coil disposed to interlink with the magnetic flux of said permanent magnet and to have actual or apparent north and south poles when energized, a first stopper disposed within an angular range corresponding to the space between said actual or apparent north and south poles produced on energizing said fixed coil to limit the angular range of rotation of said permanent magnet within 180 degrees by providing a first stop position therefor, a second stopper disposed within the same angular range as above to limit the angular range of rotation of said permanent magnet within 180 degrees by providing a second stop position therefor spaced less than 180 degrees from said first stop position, a starting energizing circuit, like a starting energizing time-setting circuit 32 in an embodiment described later, to energize said fixed coil while said permanent magnet moves halfway from the first stop position to the second stop position, thereby providing energy for permitting said permanent magnet to rotate from the first stop position to the second stop position, a damping circuit, like a damping circuit 36a in the embodiment, to feed said fixed coil with a current to damp said permanent magnet from the completion of energizing by said starting energizing circuit to the arrival of said permanent magnet at the second stop position, and a holding energizing circuit, like a holding energizing signal generating circuit 34 in the embodiment, to feed said fixed coil with a current flowing in the same direction as the current fed by said starting energizing circuit when said permanent magnet reaches the second stop position, thereby holding said permanent magnet in the second stop position.

The rotating shaft and permanent magnet of this invention rotate from the first stop position to the second stop position when a positive current is fed to the fixed coil, and from the second stop position to the first stop position when energized inversely, and perform tasks corresponding to the angle of rotation covered. Because they can rotate through an angle of approximately 180 degrees, the rotary solenoid according to this invention can be used for wider applications. Because current is fed not through the entire period in which the permanent magnet rotates but only during the starting period thereof, and the permanent magnet is brought to a stop after being damped, the rotating time thereof from the first stop position to the second stop position can be shortened and, at the same time, the crashing shock thereof against the second stopper reduced. Also, the moving parts including the permanent magnet can be prevented from vibrating, because the permanent magnet is attracted by holding current fed as soon as the permanent magnet comes in contact with the second stopper.

The principle and embodiments of the rotary solenoid according to this invention will be described hereunder by reference to the accompanying drawings.

Figure 1:
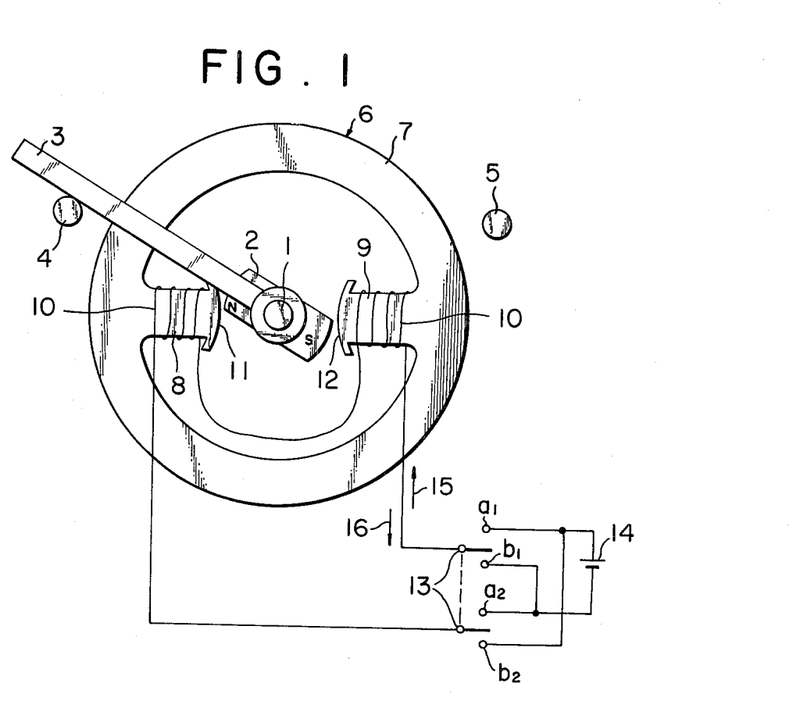
FIG. 1 is a plan view showing the operating principle of a rotary solenoid according to this invention.
Figure 2:
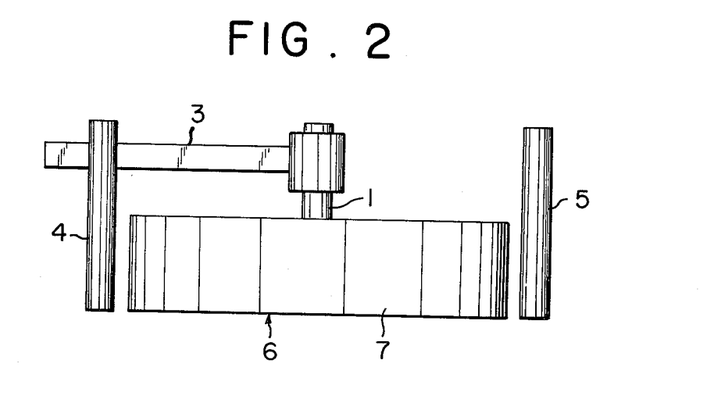
FIG. 2 is a front view similar to FIG. 1.

In FIGS. 1 through 4 illustrating the principle of the rotary solenoid according to this invention, a rotating shaft 1 is fixed with a permanent magnet 2 having north and south poles perpendicular to the axis of said rotating shaft, and an arm-like position-limiting engaging member 3. Supported by bearings provided in such stationary section as a bracket, the rotating shaft 1 rotates freely with the permanent magnet 2 and engaging member 3. Though the permanent magnet 2 in FIG. 1 is bar-shaped, it may be a cylindrical one having north and south poles thereon, too, as shown in an embodiment to be described later. The engaging member 3 also need not be arm-shaped, but of any shape so far as it comes in contact with first and second stoppers 4 and 5. The first and second stoppers 4 and 5 may be provided on the stationary section of the rotary solenoid, or on any equipment in the vicinity thereof.

Reference numeral 6 designates a member of soft magnetic material that constitutes a magnetic circuit, comprising a yoke section 7 of cylindrical iron and a pair of projected core sections 8 and 9. To facilitate understanding, this figure shows a fixed coil 10 wound around the core sections 8 and 9. On energizing the coil 10, north and south magnetic poles are established at the core sections 8 and 9. The fixed coil 10 may be wound around the core sections 8 and 9 as shown in FIG. 1, or wound like a solenoid, surrounding the permanent magnet 2, to simplify the entire system and provide the permanent magnet 2 with a uniform magnetic field, as shown in another embodiment described later. Because apparent north and south poles are established thereon, this solenoid coil also can rotate the permanent magnet 2 through an angle of less than 180 degrees.

As evident from FIG. 1, the permanent magnet 2 is disposed between a first magnetic pole 11 formed at the tip of one core section 8 and a second magnetic pole 12 at the tip of the other core section 9. In other words, the fixed coil 10 is disposed so as to interlink with the magnetic flux produced by the permanent magnet 2.

In this invention, the position of the first and second stoppers 4 and 5 is very important. The first and second stoppers 4 and 5 are disposed within an angular range not including the center lines of the first and second magnetic poles 11 and 12, so that first and second stop positions lie therebetween. Therefore, the angular space between the first and second stop positions respectively defined by the first and second stoppers 4 and 5 must be less than 180 degrees. Further, the first and second stop positions should not coincide with the first and second magnetic poles 11 and 12, respectively. Otherwise, it becomes impossible to start the permanent magnet.

A polarity changing switch 13 and a direct-current power supply 14 are provided to constitute an energizing circuit to selectively energize the fixed coil in positive and negative directions.

When the polarity changing switch 13 of the above-described apparatus is in neutral position as shown in FIG. 1, and the fixed coil 10 is not energized, north and south poles do not develop in the first and second core sections 8 and 9. Accordingly, the permanent magnet 2 is held in a position shown in FIG. 1 by a relatively small holding force, wherein said magnet 2 lies close to the core sections 8 and 9 of soft magnetic material. The same is applicable to the embodiment described later, which is devoid of the core sections 8 and 9. Of course, the permanent magnet 2 may be kept in the stop position more securely by an attracting force between a south pole at the first magnetic pole 11 and the north pole of the permanent magnet 2 and an attracting force between a north pole at the second magnetic pole 12 and the south pole of the permanent magnet 2 by connecting the switch 13 with contacts $b_1$ and $b_2$, feeding an inversed current, indicated by an arrow 16, from the direct-current power supply to the fixed coil, and thereby establishing the south pole at the first magnetic pole 11 and the north pole at the second magnetic pole 12.

Figure 3:
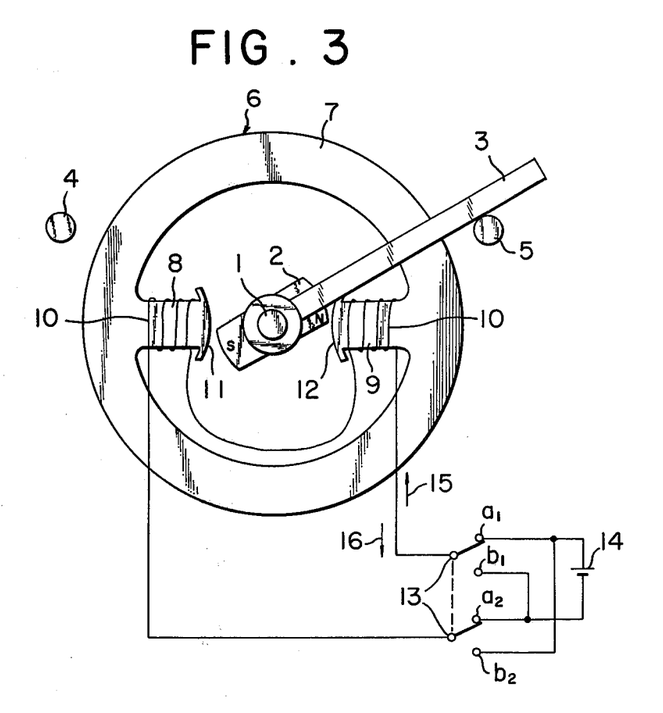
FIG. 3 is a plan view in which a permanent magnet has been rotated from the position of FIG. 1.
Figure 4:
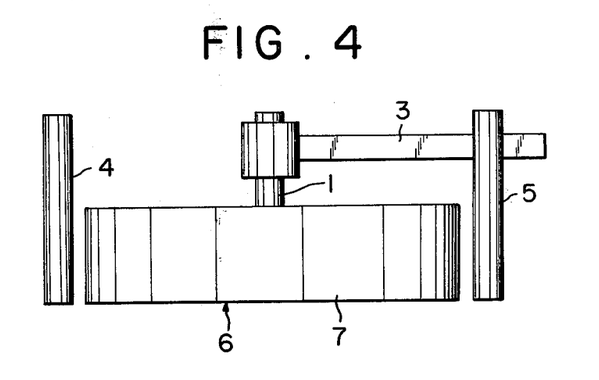
FIG. 4 is a front view similar to FIG. 3.

When the switch 13 is connected with contacts $a_1$ and $a_2$ from the state shown in FIG. 1, a positive current indicated by an arrow 15 flows into the coil 10, whereupon the first magnetic pole 11 becomes a north pole and the second magnetic pole 12 a south pole, and the permanent magnet 2 lies somewhat aslant therebetween. Then, repulsive forces develop between the north pole at the first magnetic pole 11 and the north pole of the permanent magnet 2 and between the south pole at the second magnetic pole 12 and the south pole of the permanent magnet 2, whereupon the permanent magnet 2 starts to rotate clockwise in FIG. 1. In other words, torque develops in the coil 10 as the magnetic flux passing through the permanent magnet 2 and magnetic circuit member 6 interlinks with the energized coil 10. Thereupon, the permanent magnet 2 rotates as the coil 10 is fixed. The permanent magnet 2 rotates to a vertical position in FIG. 1, where the torque becomes maximum, thence to the second stop position as shown in FIG. 3. In that position, the engaging member 3 contacts the second stopper 5 to stop the motion of the permanent magnet 2. While the coil 10 remains energized in the state of FIG. 3, north and south poles are established at the first and second magnetic poles 11 and 12, respectively, which develop attracting forces between them and the south and north poles of the permanent magnet 2. These attracting forces keep the permanent magnet 2 in that position. Even if the coil 10 has been deenergized before the engaging member 3 reaches the second stopper 5, the permanent magnet 2 continues to rotate, by force of inertia, to the second stop position defined by the second stopper 5, conditional on that the north pole of the permanent magnet 2 has passed the vertical center line in FIG. 1. Without the second stopper 5, the south pole established at the second magnetic pole 12 would perfectly oppose the north pole of the permanent magnet 2. Then, even if an inversed current were fed to the coil 10, it would be impossible to impart a counterclockwise or clockwise torque to the permanent magnet 2.

The permanent magnet 2 is returned from the position of FIG. 3 to that of FIG. 1 by connecting the switch 13 with the contacts $b_1$ and $b_2$ from the state of FIG. 3. Thereupon, an inversed current, indicated by an arrow 16, flows to the coil 10, and the permanent magnet 2 rotates to the first stop position shown in FIG. 1, reversing the order followed when moving from the position of FIG. 1 to that of FIG. 3. If the first and second stoppers 4 and 5 are disposed symmetrically, the torque of reversed rotation can be made equal to that of positive rotation.

Now a rotary solenoid embodying this invention will be described by reference to FIGS. 5 through 11. Items designated by reference numerals 1 through 7, 10, 15 and 16 in FIGS. 5 through 8 will not be explained, since their makeup and function are the same as those of the items denoted by the same reference numerals in FIGS. 1 through 4.

Figure 5:
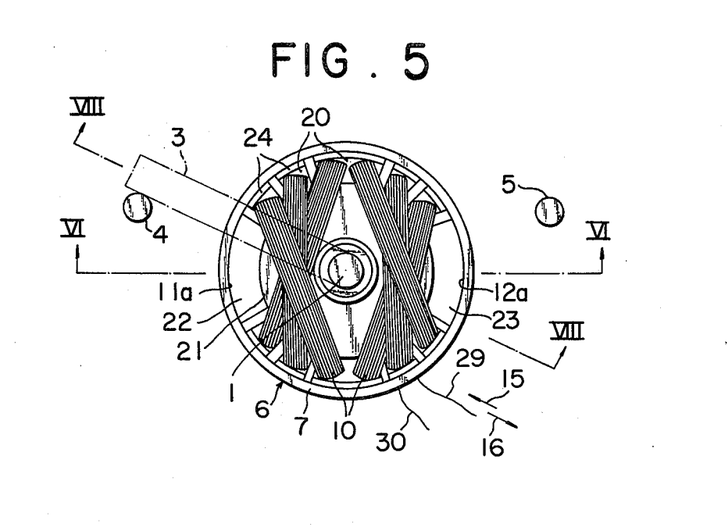
FIG. 5 is a plan view showing the inside of a rotary solenoid embodying this invention, with a bracket thereof taken away.
Figure 6:
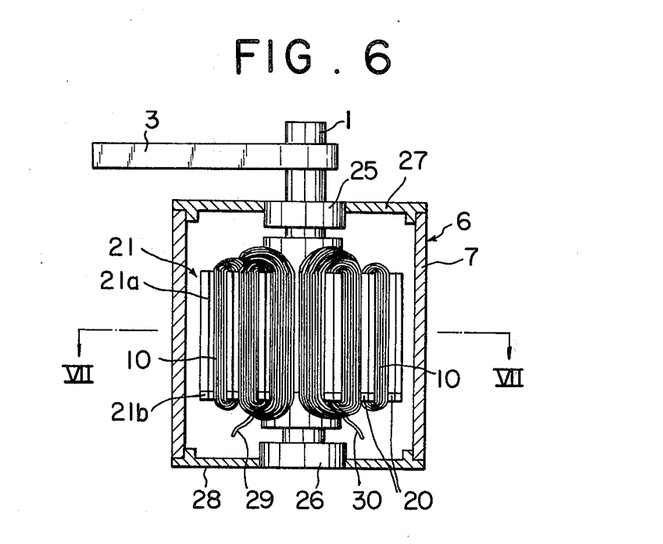
FIG. 6 is a front view, with a part thereof cut open along the line VI—VI of FIG. 5.
Figure 7:
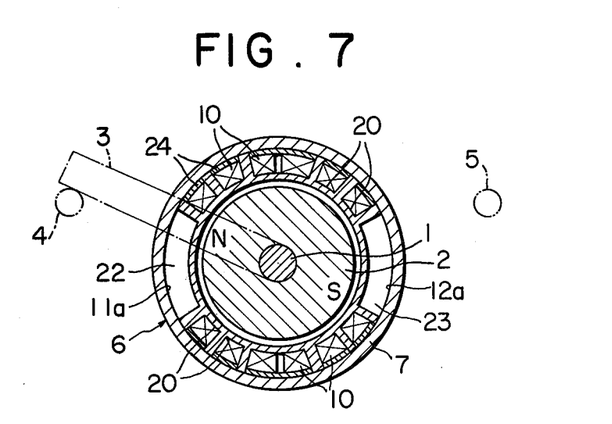
FIG. 7 is a cross-sectional view taken along the line VII—VII of FIG. 6.

In a rotary solenoid shown in FIGS. 5 through 8, a non-magnetic core of synthetic resin 21, having a plurality of slots 20, is used to facilitate winding a coil 10 in a solenoid-like shape. As evident from FIGS. 5 through 7, the non-magnetic core 21 has ten slots 20, which extend in the direction of the axis of a rotating shaft 1 as shown in FIG. 6. To attain as much resemblance as possible to the solenoid, the coil 10 is uniformly wound around the slots 20 of the core 21. As shown in FIGS. 5 and 7, the coil 10 is not wound around the left and right ends of the core 21, thus leaving a left open solenoid end 22 and a right open solenoid end 23. As seen in FIG. 5, the coil 10 is wound clear of a rotating shaft 1. The diameter of the solenoid reduces progressing apart from the shaft 1, following the cross-sectional contour of the cylindrical core 21 extending axially. As in an ordinary solenoid, a uniform magnetic field can be established inside the solenoid-like coil 10. The non-magnetic core 21 comprises cores 21a and 21b that are axially bisectable. The cores 21a and 21b are put together outside a permanent magnet 2 attached to the rotating shaft 1 to make up the non-magnetic core 21, then the coil 10 is formed by winding a conductor therearound.

The core 21 wound with the coil 10 is press-fitted in the clindrical soft magnetic member constituting magnetic circuit 6 of soft iron that functions both as a case and a yoke, and fixed thereto with a bonding agent. To assure perfect insulation between the coil 10 and the magnetic circuit member 6, an insulating synthetic resin sheet 24 is inserted therebetween.

A pair of bearings 25 and 26 to rotatably support the rotating shaft 1 are fitted in a pair of brackets 27 and 28 which are in turn cocentrically fitted to the yoke section 7 or the cylindrical magnetic circuit member 6.

Figure 8:
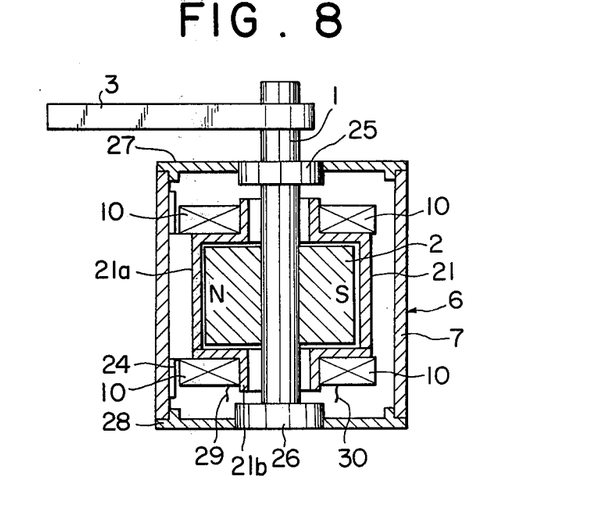
FIG. 8 is a cross-sectional view taken along the line VIII—VIII of FIG. 5.

The permanent magnet 2 attached to the rotating shaft 1 is cylindrical in shape, and has north and south poles at two opposite external ends of the radial cross-section thereof, as shown in FIGS. 7 and 8. When the rotary solenoid is in use, the permanent magnet 2 is prevented from perfectly coinciding with the direction of magnetic flux developed on energizing the solenoid coil 10 by the first and second stoppers 4 and 5. Instead, the north and south poles are disposed aslant as exemplified in FIG. 7.

When a pair of coil ends 29 and 30 are connected to a selective bi-directional energizing circuit and a positive current is fed to the coil 10 as indicated by an arrow 15 in FIG. 5, a substantially uniform magnetic field is established in the coil 10. As the coil 10 of this embodiment is wound around the non-magnetic core 21, the magnetic poles 11 and 12 at the core sections 8 and 9 do not develop, unlike the case previously described by reference to the principle drawings. Instead, the paired open solenoid ends 22 and 23 become apparent magnetic poles. In FIGS. 5 and 7, reference character 11a designate a first apparent magnetic pole, and 12a a second apparent magnetic pole. On feeding a positive current to the coil 10, the first apparent magnetic pole 11a becomes a north pole, and the second apparent magnetic pole 12a a south pole, whereupon the permanent magnet 2 lies aslant in the horizontal magnetic flux extending from the first apparent magnetic pole 11a to the second pole 12a in FIG. 7. Then a torque arises, and the permanent magnet 2 rotates clockwise in FIGS. 5 and 7. This clockwise rotation terminates in the second stop position where the engaging member 3 contacts the second stopper provided on nearby equipment. When inversely energized while the permanent magnet 2 stays in the second stop position, the first apparent magnetic pole 11a becomes a south pole and the second apparent magnetic pole 12a a north pole, whereby the permanent magnet 2 rotates counterclockwise until it returns to the first stop position.

Figure 9:
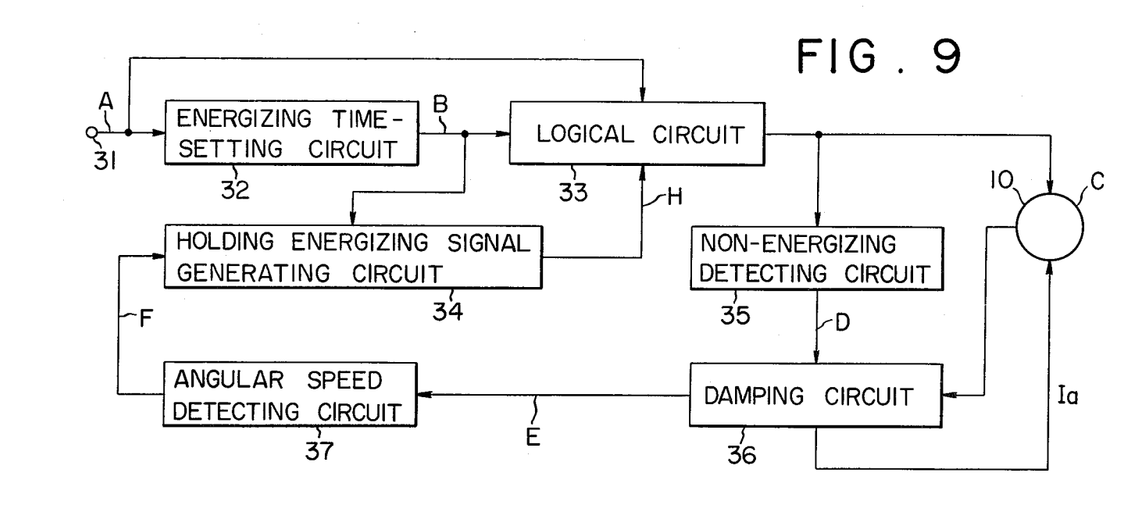
FIG. 9 is a block diagram of a positively energized drive control circuit in the rotary solenoid shown in FIG. 5.
Figure 10:
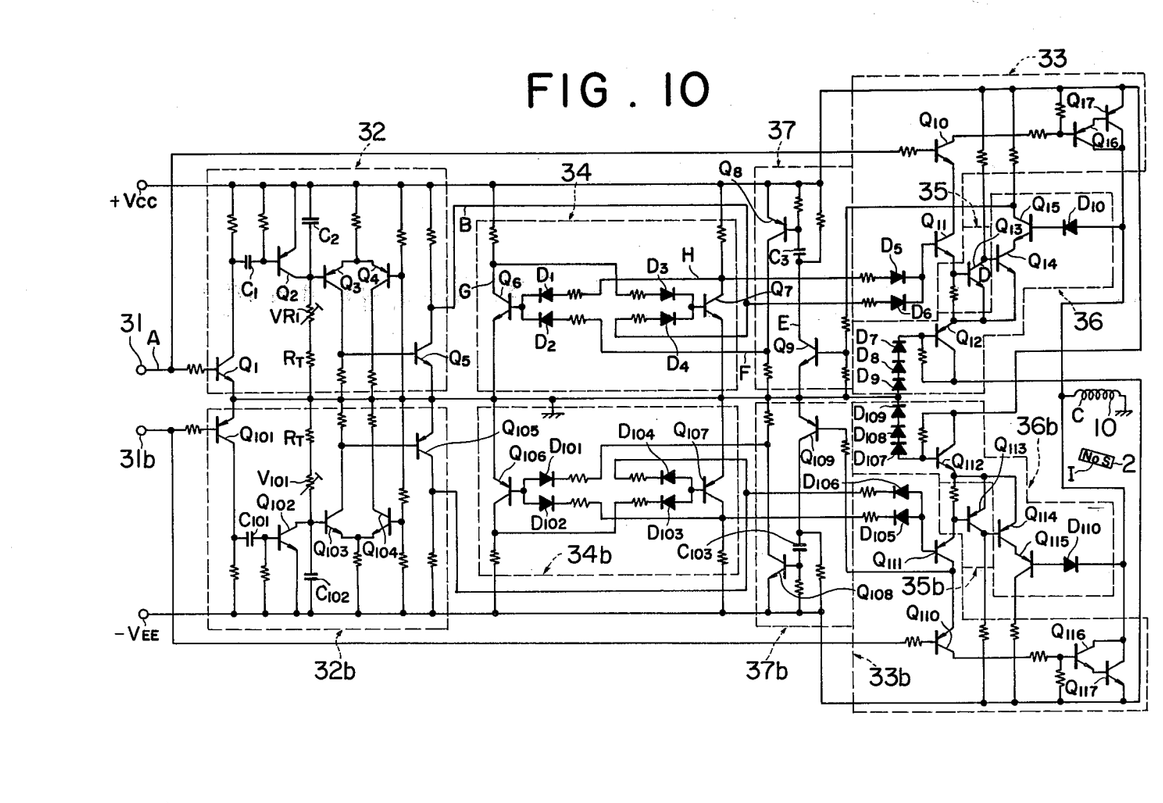
FIG. 10 is a concrete circuit diagram similar to FIG. 9 and showing a negatively energized circuit, too.

If the coil 10 of the rotary solenoid shown in FIGS. 5 through 8 is energized uncontrolledly, the engaging member 3 collides against the first or second stopper 4 or 5, thus generating a noise offensive to the ear and shortening the life of the stoppers 4 and 5 and the engaging member 3. To prevent this, a control drive circuit is provided as shown in FIGS. 9 and 10.

Figure 11:
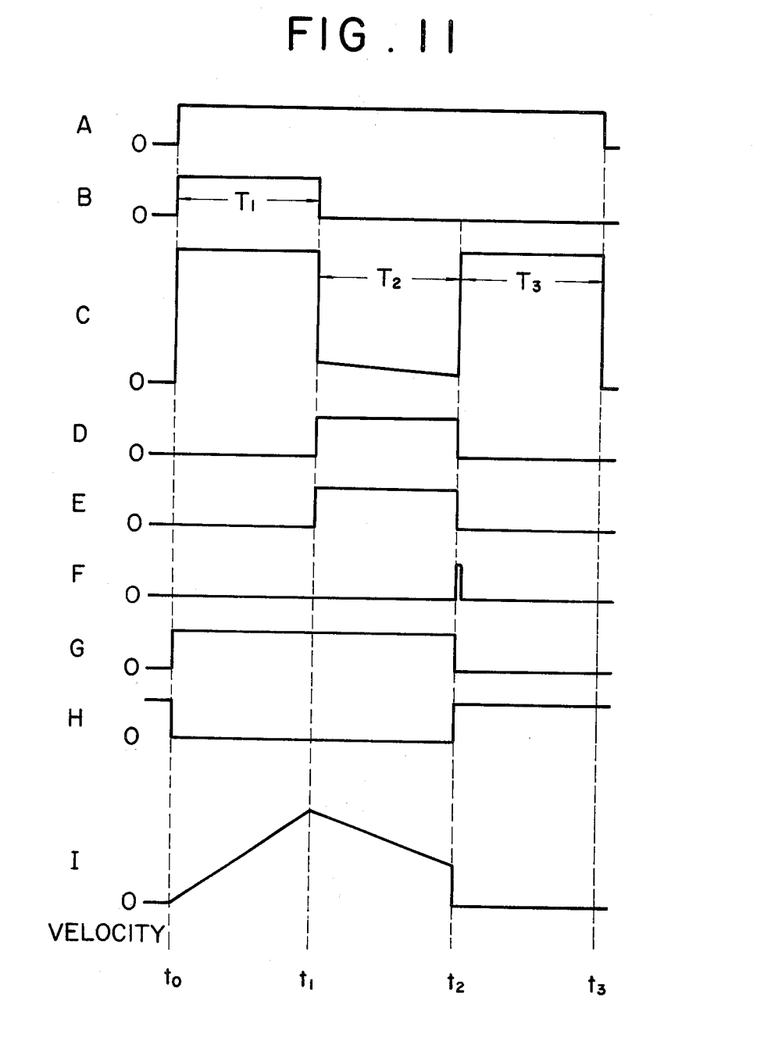
FIG. 11 shows waves at points A through I in FIGS. 9 and 10.

The control drive circuit will be described briefly first, by reference to a block diagram of FIG. 9. A drive signal as shown in FIG. 11 (A) is inputted in a rotary solenoid drive signal input terminal 31. When the drive signal in FIG. 11 (A) is provided at time point $t_0$, a starting energizing time-setting circuit 32 connected to the input terminal 31 respondingly generates a starting energizing signal, with a pulse width $T_1$, from $t_0$ to $t_1$. Item 33 is a logical circuit to which the input terminal 31, starting energizing time-setting circuit 32, and a holding energizing signal generating circuit 34 are connected. This logical circuit generates an and-output from the starting energizing and drive signals and an and-output from the holding energizing and drive signals. More precisely, the logical circuit 33 provides a starting voltage to the coil 10 for a period indicated by $t_0$-$t_1$ in FIG. 11 (C), as the and-output of the drive signal in FIG. 11 (A) and the starting energizing signal in FIG. 11 (B). It also provides a holding voltage to the coil 10 for a period indicated by $t_2$-$t_3$ in FIG. 11 (C), as the and-output of the drive signal in FIG. 11 (A) and the high-level holding energizing signal beyond $t_2$ in FIG. 11 (H). Time point $t_3$ in FIG. 11 is one at which the engaging member 3, rotating with the permanent magnet 2, contacts the stopper 5. Therefore, the pulse width $T_1$ of the starting energizing signal in FIG. 11 (B) is smaller than the full rotating time of the permanent magnet 2. When such starting energizing signal applies a starting voltage to the coil 10, the permanent magnet 2 starts to rotate. Although the starting voltage vanishes before the permanent magnet 2 reaches the second stop position, the permanent magnet 2 continues to rotate, by a force of inertia, to the second stop position, once it has started rotating and current is fed until the north pole thereof passes the vertical center line in FIG. 7.

A non-energizing detecting circuit 35 connected to the energizing circuit leading to the coil 10 detects the extinction of the starting energizing signal and the start of the non-energizing period $t_1$-$t_2$ in FIG. 11. The output of the non-energizing detecting circuit 35 in FIG. 11 (D) is provided by a damping circuit 36. When the non-energizing detecting circuit 35 detects the period $t_1$-$t_2$ in FIG. 11, the rotary solenoid becomes damped. In this embodiment, when the non-energizing detecting circuit 35 detects the non-energizing condition, an inversed current Ia corresponding to a speed electromotive force in the coil 10 is fed from the damping circuit 36 to the coil 10, thereby damping the rotation of the permanent magnet 2. Of course, this damping action is not strong enough to stop the permanent magnet 2 before it reaches the second stop position. The fact that voltage is not zero between $t_1$ and $t_2$ in FIG. 11 (C) indicates that the speed electromotive voltage is fed to the coil 10. As energizing is discontinued at point $t_1$, the rotating speed of the permanent magnet 2 starts to slow down as shown in FIG. 11 (I). This speed drop is accelerated by the action of the damping circuit 36 between $t_1$ and $t_2$. When the permanent magnet 2 reaches the second stop position and the engaging member 3 contacts the second stopper 5, the permanent magnet 2 stops and the coil 10 no longer generates the speed electromotive voltage. Accordingly, the damping signal generated by the damping circuit 36, shown in FIG. 11 (E) vanishes at point $t_2$.

Reference numeral 37 denotes an angular speed detecting circuit that detects the stopping of the permanent magnet 2 based on the operating signal from the damping circuit 36. This angular speed detecting circuit 37 generates a zero angular speed detecting signal shown in FIG. 11 (F), responding to the vanishing of the damping signal in FIG. 11 (E). This zero angular speed detecting signal is fed as a trigger signal to the flip-flop holding energizing signal generating circuit 34. At point $t_2$, flip-flop of the holding energizing signal generating circuit 34 is reversed, whereupon one transistor making up the flip-flop circuit produces output as shown in FIG. 11 (G) and the other transistor produces output as shown in FIG. 11 (H). A high-level signal beyond $t_2$ of FIG. 11 (H) is inputted as a holding energizing signal in the logical circuit 33 as described previously, thereby applying a holding voltage to the coil 10 between $t_2$ and $t_3$. Receiving a reset signal synchronized with the rise of the starting energizing time-setting circuit 32, the holding energizing signal generating circuit 34 returns to the original condition. Even if no holding voltage is applied beyond $t_2$, the permanent magnet 2 stops or remains in the second stop position by the holding force inherent therein. But application of the holding voltage provides greater holding force and, at the same time, prevents the vibration of the engaging member 3 colliding against the stopper 5.

Even when the coil 10 is applied with voltage throughout the entire rotating period, corresponding to the drive signal of FIG. 11 (A), the permanent magnet 2 reaches the second stop position and is held therein. But the angular speed of the permanent magnet 2 in the second stop position increases, and the engaging member 3, colliding against the stopper 5, generates a greater noise. When deenergized and damped before the permanent magnet 2 reaches the second stop position as in this embodiment, the engaging member 3 comes in contact with the stopper 5 at a reduced speed. Further, the sharp reduction of the angular speed by damping permits shortening the rotating time between the first and second stop positions.

FIG. 10 is a control drive circuit diagram or a concrete version of the block diagram in FIG. 9. In FIG. 10, items 10, 31, 32, 33, 34, 35, 36 and 37 correspond to those designated by the same reference numerals in FIG. 9. Items 31b, 32b, 33b, 34b, 35b, 36b and 37, all having a suffix "b," make up an inversed control drive circuit and correspond to those without the suffix with the exception of polarity.

The starting energizing time-setting circuit 32 includes a trigger circuit comprising a transistor $Q_1$, a capacitor $C_1$, a transistor $Q_2$, and so on. A trigger signal generaed by this trigger circuit at point $t_0$ in FIG. 11 triggers a single ballast multi-vibrator comprising transistors $Q_3$ and $Q_4$, a capacitor $C_2$, a resistor $R_T$, and so on, to generate a pulse shown in FIG. 11 (B).

A signal obtained from the collector of a transistor $Q_5$, as shown in FIG. 11 (B), is fed to the base of a transistor $Q_{11}$ in the logical circuit 33 through a diode $D_6$. As the signal of FIG. 11 (A) is fed from the input terminal 31 to a transistor $Q_{10}$, transistors $Q_{16}$ and $Q_{17}$ conduct when the transistors $Q_{10}$ and $Q_{11}$ conduct between $t_0$ and $t_1$, and a positive current is fed from a $+V_{cc}$ power supply terminal through a transistor $Q_{17}$ to the coil 10.

At time point $t_1$ in FIG. 11, the transistor $Q_{11}$ becomes biased off, and therefore the transistor $Q_{17}$ also is cut off. At the same time, a transistor $Q_{13}$ in the non-energizing detecting circuit 35 becomes biased off, raising the level of the collector thereof as shown in FIG. 11 (D), and a transistor $Q_{14}$ in the damping circuit 36 conducts. Meanwhile, as the coil 10 generates a speed electromotive force based on the rotation of the permanent magnet 2 by force of inertia, a diode $D_{10}$ in the damping circuit 36 conduits to bring a transistor $Q_{15}$ in conduction. Accordingly, the coil 10, diode $D_{10}$, transistors $Q_{15}$, $Q_{14}$ and $Q_{12}$, and $-V_{ee}$ make up a circuit between time points $t_1$ and $t_2$. Then, an inversed current flows to the coil 10, corresponding to the speed electromotive force developed therein, to produce a damping effect. The transistor $Q_{12}$ is provided to insure the braking effect of the speed electromotive force of the coil 10.

At time point $t_2$, the permanent magnet 2 stops to rotate and, therefore, generate the speed electromotive force. Consequently, the diode $D_{10}$ and transistor $Q_{15}$ are biased off, the transistor $Q_2$ in the angular speed detecting circuit 37 conducts, and a differentiation circuit comprising a capacitor $C_3$ and a transistor $Q_8$ generates a trigger signal shown in FIG. 11 (F). This trigger signal is fed to the base of a transistor $Q_6$ in the holding energizing signal generating circuit 34, which conducts to lower the level of the collector thereof at time point $t_2$ as shown in FIG. 11 (G), and cut off the other flip-flop transistor $Q_7$ to raise the level of the collector thereof as shown in FIG. 11 (H). As the collector of the transistor $Q_7$ connects through a diode $D_5$ with the base of the transistor $Q_{11}$, the transistor $Q_{11}$ conducts again at time point $t_2$, which brings the transistor $Q_{16}$ in conduction again to feed a positive holding current to the coil 10.

As the collector of the transistor $Q_5$ connects through a diode $D_4$ with the base of the flip-flop transistor $Q_7$, the flip-flop system is reset simultaneously with the generation of the signal of FIG. 11 (B) from the collector of the transistor $Q_5$.

The permanent magnet 2 is returned from the second stop position to the first stop position by feeding a drive signal to an input terminal 31b. Then, an inversed current flows to the coil 10, as in the case of the positive control drive circuit, and the permanent magnet 2 rotates back to the first stop position.

As evident from the above, this rotary solenoid can generate bi-directional driving forces by simply changing the direction of current supplied.

Also, the angular range of rotation can be extended close to 180 degrees, or any angular range can be selected within the limit of 180 degrees.

The use of the non-magnetic core 21 facilitates the winding of the coil 10 therearound, formation of a good solenoid enclosing the permanent magnet 2, disposing the coil 10 and the permanent magnet 2 in good relationship, and obtaining the desired torque.

As shown in FIG. 11 (C), starting energizing is done between $t_0$ and $t_1$, which is followed by deenergizing between $t_1$ and $t_2$ that takes place before the permanent magnet 2 reaches the second stop position, and then by holding energizing that lasts until the permanent magnet 2 comes very close to the second stop position. The damping action between $t_1$ and $t_2$ reduces the angular speed at which the engaging member 3 collides against the stopper 5. This means that the impact noise of the engaging member 3 can be lowered even when the operating time between the first and second stop positions is shortened. The impact alone may be reduced by shortening the period $t_0$-$t_1$, in which case, however, the permanent magnet 2 rotates at a lower speed, or the operating time becomes longer.

Even if deenergized at point $t_1$, in addition, this rotary solenoid detects point $t_2$ to resume energizing. Therefore, a south pole is established at the magnetic pole 12a simultaneously with the collision of the engaging member 3 against the stopper 5, which attracts the north pole of the permanent magnet 2. This restricts the vibration of the engaging member 3 colliding against the stopper 5.

This embodiment is capable of performing quick and appropriate damping, since the damping circuit thereof is actuated on detecting the speed electromotive voltage in the coil 10.

Reenergizing at point $t_2$ can be accomplished quickly, since it takes place on detecting that the speed electromotive voltage has become zero.

Further, the use of the magnetic circuit member 6 not only as a yoke but also as a case in which the core 21 is press-fitted is conducive to simplifying the entire structure.

Figure 12:
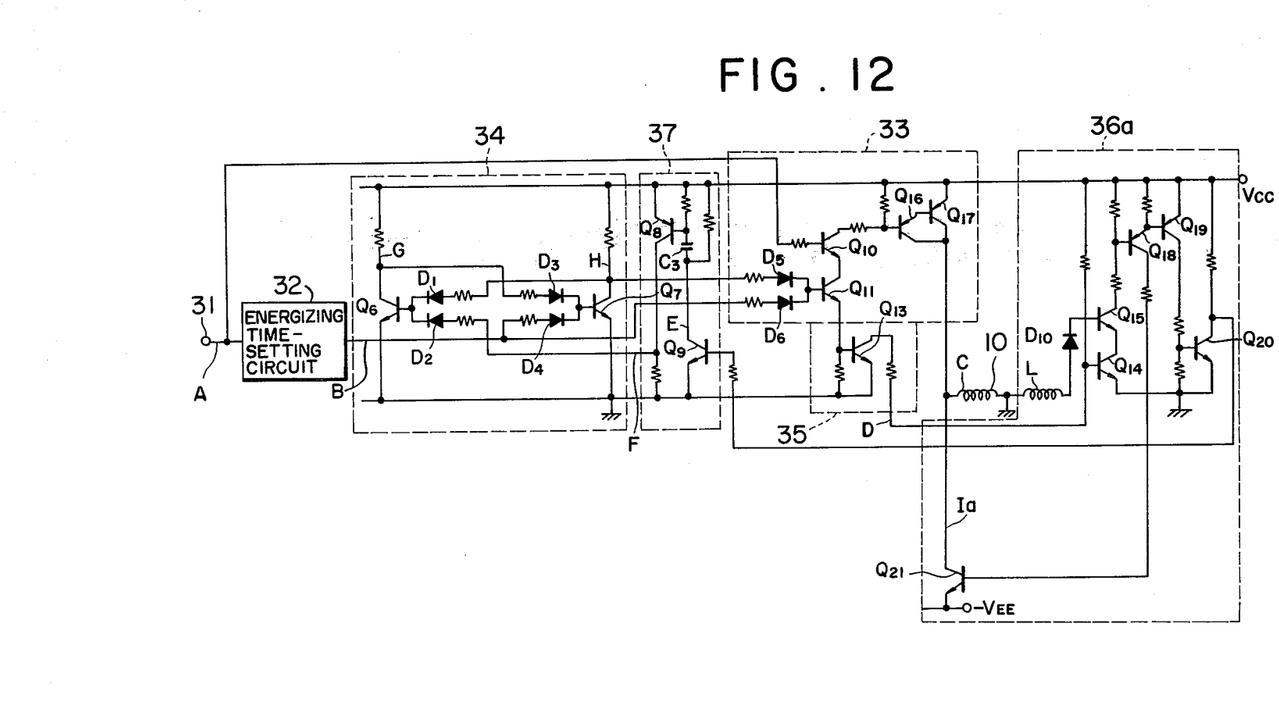
FIG. 12 is a partial circuit diagram showing a modification of FIG. 10.

FIG. 12 shows a modification of the control drive circuit in FIG. 10. In this figure, items designated by reference numerals 10, 31, 32, 33, 34, 35 and 37 are similar to those represented by the same reference numerals in FIG. 10, excepting that the control circuit 36 in FIG. 10 is modified to 36a. The modified control circuit 36a has a speed detecting coil L. This coil L is provided on the stator side to prevent magnetic connection with the coil 10, and generates a detecting output by a permanent magnet, not shown, fixed to the rotating shaft while the permanent magnet 2 is rotating. When the transistor $Q_{13}$ becomes biased off at $t_1$ in FIG. 11, the transistor $Q_{14}$ conducts, and the transistor $Q_{15}$ also conducts by the voltage of the speed detecting coil L. Thereupon, transistors $Q_{18}$ and $Q_{21}$ conduct, an inversed current flows through a circuit comprising the coil 10, transistor $Q_{21}$ and $-$Vee power supply, and the permanent magnet 2 becomes damped. This damping force does not depend on the speed electromotive voltage of the coil 10, but on the $-$Vee voltage. Therefore, the desired damping force can be obtained with ease. Therefore, the angular speed at which the engaging member 3 collides against the stopper 5 can be reduced to zero by regulating the current fed to the transistor $Q_{21}$. At point $t_2$ in FIG. 11, the voltage of the coil L becomes zero and the transistor $Q_{18}$ becomes biased off. Consequently, transistors $Q_{19}$ and $Q_{20}$ become biased off to feed a signal corresponding to the zero angular speed to the base of the transistor $Q_9$ and resume energizing at point $t_2$.

Figure 13:
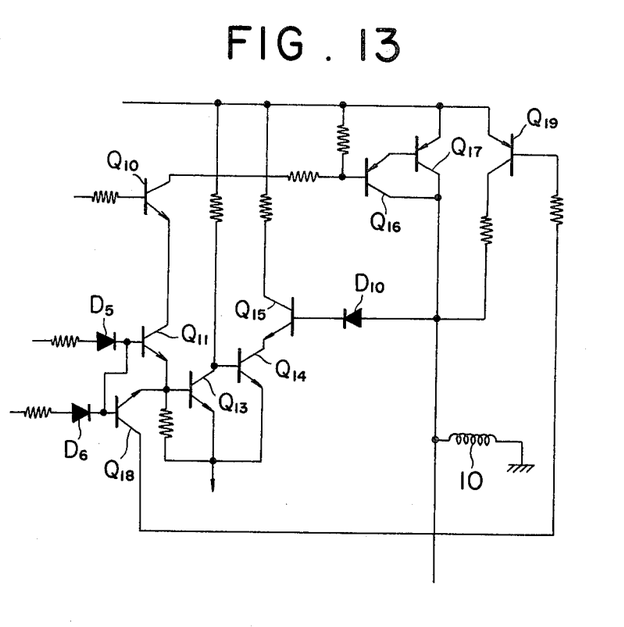
FIG. 13 is a circuit diagram showing a modification of a coil current supply section in FIG. 10.

FIG. 13 shows a partial modification of the circuit in FIG. 10. The modification lies in the arrangement of the transistor $Q_{18}$ in parallel with the transistor $Q_{19}$ so as to conduct only between $t_0$ and $t_1$ in FIG. 11 and feed a higher current to the coil 10 than between $t_2$ and $t_3$. To bring the transistor $Q_{19}$ into conduction, the transistor $Q_{18}$ is connected to the output side of the diode $D_6$, so that the transistors $Q_{18}$ and $Q_{19}$ conduct when the diode $D_6$ conducts.

Figure 14:
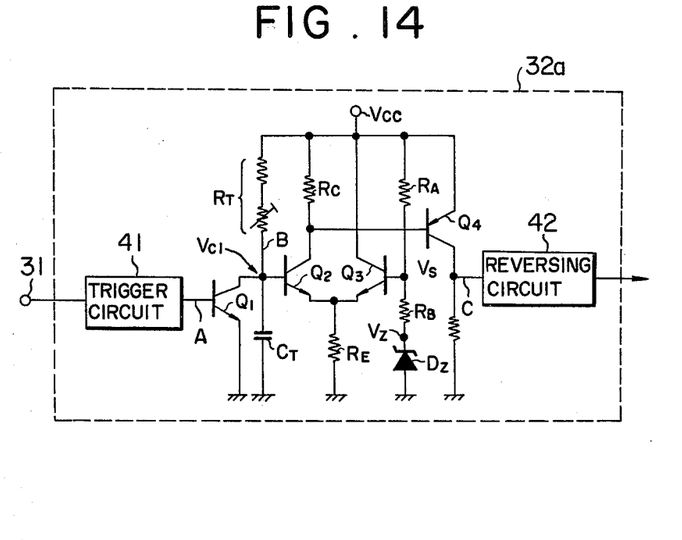
FIG. 14 is a circuit diagram showing a modification of a starting energizing time-setting circuit in FIG. 10.
Figure 15:
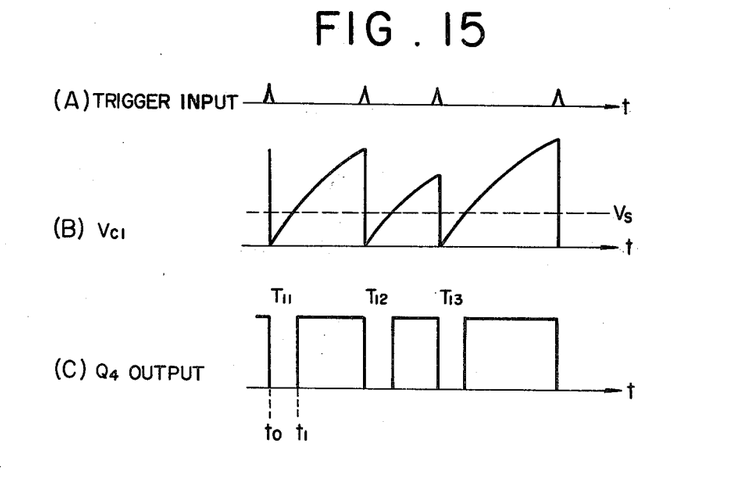
FIG. 15 shows waves at points A through C in FIG. 14
Figure 16:
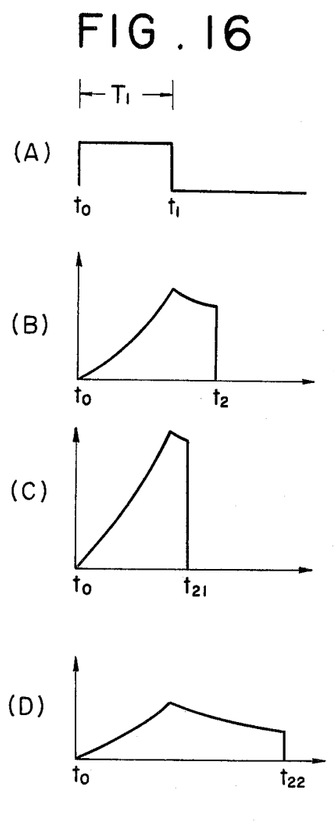
FIGS. 16 and 17 show the relationships between the starting energizing time and power supply voltage, and between the operating time and speed.

FIG. 14 shows a modification 32a of the starting energizing time-setting circuit 32 in FIG. 10. This modified starting energizing time-setting circuit 32a can keep constant the time in which the engaging member 3 moves from the first stopper 4 to the second stopper 5, even if the power supply voltage varies. If the starting energizing time $T_1$ between $t_0$ and $t_1$ in FIG. 11 is constant and only the voltage applied to the coil 10 changes, the time in which the engaging member 3 reaches the stopper 5 changes as shown in FIGS. 16 (B), (C) and (D). When the starting energizing time $T_1$ is constant and the voltage is normal as shown in FIG. 16 (A), the engaging member 3 reaches the second stop position at time point $t_2$ shown in FIG. 16 (B). When the coil voltage rises, the engaging member 3 reaches the second stop position at point $t_{21}$, which is earlier than $t_2$, shown in FIG. 16 (C). When the coil voltage drops, the engaging member 3 reaches the second stop position at point $t_{22}$, later than $t_2$. Such fluctuations in the operating time is inconvenient. In the circuit shown in FIG. 14, a trigger circuit 41 generates a trigger output shown in FIG. 15 (A) when the input terminal 31 inputs a drive signal shown in FIG. 11 (A). On receiving the trigger signal, the transistor $Q_1$ momentarily conducts and then becomes biased off when a capacitor $C_t$ has been discharged. Then the capacitor $C_t$ becomes charged through a resistor $R_t$ with the same power supply voltage $+$Vcc that is fed to the coil 10. When the voltage $V_{c1}$ charged to the capacitor $C_t$ gradually rises to $V_s$ determined by a Zener diode $D_z$, at an angle proportional to the level of the power supply voltage $+$Vcc as shown in FIG. 15 (B), the transistor $Q_2$ conducts, followed by the transistor $Q_4$ as well. Thereupon, the collector voltage of the transistor $Q_4$ rises as shown in FIG. 15 (C). Accordingly, the desired starting energizing signal is obtained by drawing a reversing signal for the low-level period between $t_0$ and $t_1$ through a reversing circuit 42.

Figure 17:
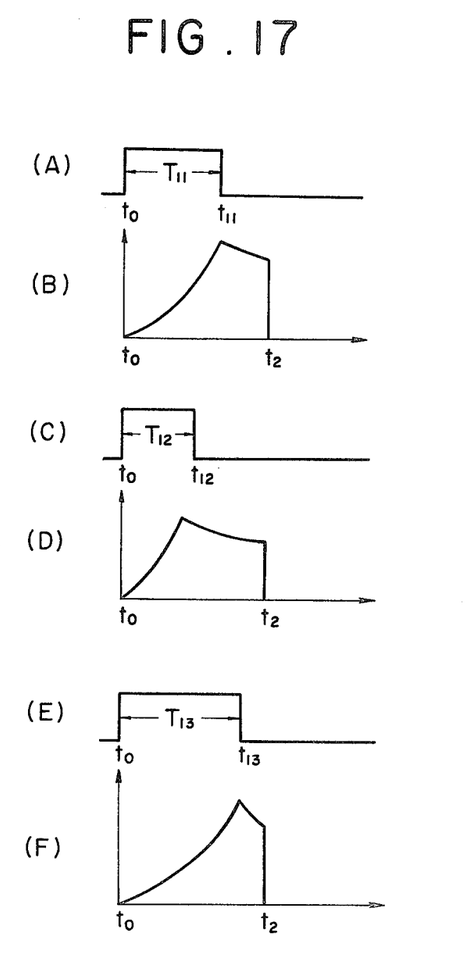

Starting energizing periods $T_{11}$, $T_{12}$ and $T_{13}$ set for individual trigger signals shown in FIG. 15 (A) become shorter with an increase in the power supply voltage. Accordingly, the energizing time $T_{11}$ shown in FIG. 17 (A) is obtained when the power supply voltage is normal, and the permanent magnet 2 travels from the first to the second stop position in the time $t_0$-$t_2$. When the power supply voltage rises, the energizing time $T_{12}$ shortens as shown in FIG. 17 (B). But the operating time is $t_0$-$t_2$, since the coil voltage is high. When the power supply voltage falls, the energizing time $T_{13}$ becomes longer as shown in FIG. 17 (E). But the operating time is held at $t_0$-$t_1$, since the coil voltage drops. Regardless of the power supply voltage level, the operating time thus is always kept constant. This modified embodiment is applicable regardless of whether or not holding energizing between $t_2$ and $t_3$ as shown in FIG. 11.

Figure 18:
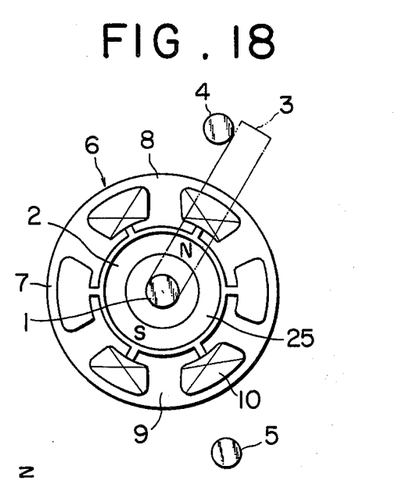
FIGS. 18 and 19 are plan views schematically showing the construction of modified permanent magnet and coil.
Figure 19:
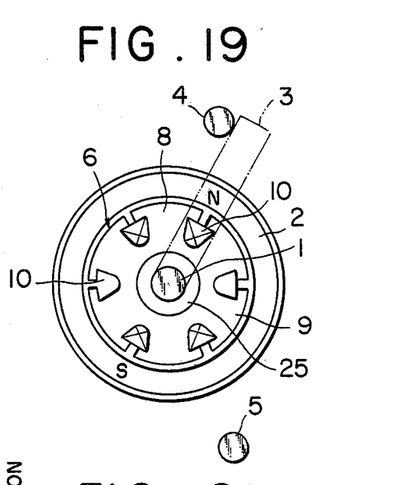

FIGS. 18 and 19 show modifications of the rotary solenoid proper, in which similar reference numerals denote substantially similar parts in FIGS. 1 and 7. In the modification of FIG. 18, the coil 10 is wound around soft magnetic cores 8 and 9, instead of around the non-magnetic core 21. FIG. 19 shows the modification of out-rotor construction, in which a cylindrical permanent magnet 2 rotates on the outside of the coil 10.

Figure 20:
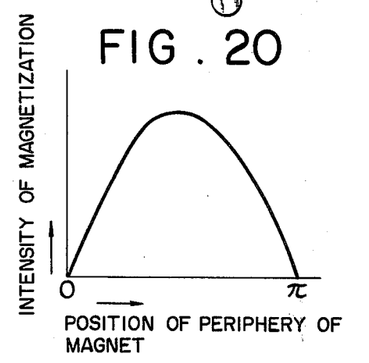
FIGS. 20, 21 and 22 are characteristic curves showing varied magnetized conditions of the permanent magnet.
Figure 21:
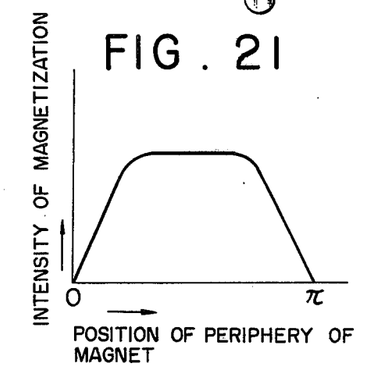
Figure 22:
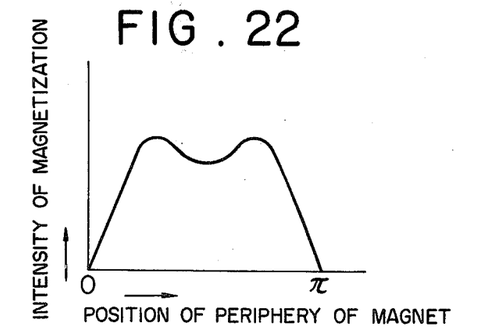

It will be evident from the foregoing that this invention is not limited to the embodiments and modifications thereof described herein, but susceptible of many other modifications and variations. For example, the permanent magnet 2 may be magnetized variedly as shown in FIGS. 20, 21 and 22, so as to obtain the best torque suited to each shape of the magnetic circuit member 6 of soft magnetic material. The task dependent on the rotation of the permanent magnet 2 may be accomplished either by the engaging member 3, the rotating shaft 1, the permanent magnet 2 itself, or by attaching a power transmitting member to the shaft 1. The first and second stoppers 4 and 5 may not necessarily be provided separate from the rotary solenoid, but integrally with the case thereof and the like. To definitely define the angular range of solenoid rotation, such range may be indicated on the solenoid case and the like. In the abovedescribed embodiments, the magnetic fluxes of both permanent magnet 2 and coil 10 pass the magnetic circuit member 6. But either one of them alone may be passed therethrough, as well. The permanent magnet 2 may be bar- or plate-shaped. The holding energizing by the holding energizing signal generating circuit 34 need not be continued as long as described previously. It may be shortened, such as to a point when the vibration of the moving parts, including the permanent magnet 2, stops perfectly.

What is claimed is:

1. Electromagnetic rotating apparatus comprising a rotating shaft, a bipolar permanent magnet fixed to said rotating shaft and radially magnetized, a fixed coil disposed to interlink with the magnetic flux of said permanent magnet, symmetrically with respect to said rotating shaft, the fixed coil providing a magnetic field perpendicular to the axis of said rotating shaft when energized, first and second stoppers to limit the rotation of said permanent magnet within an angular range of less than 180 degrees and stop the rotation thereof before said permanent magnet reaches a position where the number of magnetic flux interlinking with said fixed coil becomes maximum, and an energizing circuit to selectively energize said fixed coil positively or inversely.

2. Electromagnetic rotating apparatus comprising a rotating shaft, a bipolar permanent magnet fixed to said rotating shaft and radially magnetized, a fixed coil disposed to interlink with the magnetic flux of said permanent magnet, symmetrically with respect to said rotating shaft, the fixed coil providing a magnetic field perpendicular to the axis of said rotating shaft when energized, first and second stoppers to limit the rotation of said permanent magnet within an angular range of less than 180 degrees and stop the rotation thereof before said permanent magnet reaches a position where the number of magnetic flux interlinking with said fixed coil becomes maximum, a starting energizing circuit to energize said fixed coil while said permanent magnet moves halfway from a first stop position to a second stop position defined by the first and second stoppers, thereby providing energy for permitting said permanent magnet to rotate from the first stop position to the second stop position, a damping circuit to feed said fixed coil with a current to damp said permanent magnet from the completion of energizing by said starting energizing circuit to the arrival at the second position, and a holding energizing circuit to feed said fixed coil with a current flowing in the same direction as the current fed by said starting energizing circuit when said permanent magnet reaches the second stopper, thereby holding said permanent magnet in the second stop position.

3. Electromagnetic rotating apparatus according to claim 1 or 2, wherein said fixed coil is wound around a core of non-magnetic material.

4. Electromagnetic rotating apparatus according to claim 3, wherein said core of non-magentic material is a core of synthetic resin having a plurality of slots extending in the direction of the axis of said rotating shaft.

5. Electromagnetic rotating apparatus according to claim 4, wherein said damping circuit feeds a damping current to said fixed coil in accordance with speed electromotive force generated therein.

6. Electromagnetic rotating apparatus according to claim 4, wherein said holding energizing circuit starts energizing on detecting that speed electromotive force in said fixed coil has become substantially zero.

7. Electromagnetic rotating apparatus according to claim 3, wherein said fixed coil is a solenoid coil that surrounds said permanent magnet to provide a substantially uniform magnetic field thereto.

8. Electromagnetic rotating apparatus according to claim 3, wherein said damping circuit feeds a damping current to said fixed coil in accordance with speed electromotive force generated therein.

9. Electromagnetic rotating apparatus according to claim 3, wherein said holding energizing circuit starts energizing on detecting that speed electromotive force in said fixed coil has become substantially zero.

10. Electromagnetic rotating apparatus according to claim 3, wherein said damping circuit feeds a damping current to said fixed coil in accordance with speed electromotive force therein, and said holding energizing circuit starts energizing on detecting that said speed electromotive force in said fixed coil has become substantially zero.

11. Electromagnetic rotating apparatus according to claim 1 or 2, wherein said fixed coil is a solenoid coil that surrounds said permanent magnet to provide a substantially uniform magnetic field thereto.

12. Electromagnetic rotating apparatus according to claim 11, wherein said damping circuit feeds a damping current to said fixed coil in accordance with speed electromotive force generated therein.

13. Electromagnetic rotating apparatus according to claim 11, wherein said holding energizing circuit starts energizing on detecting that speed electromotive force in said fixed coil has become substantially zero.

14. Electromagnetic rotating apparatus according to claim 1 or 2, wherein said damping circuit feeds a damping current to said fixed coil in accordance with speed electromotive force generated therein.

15. Electromagnetic rotating apparatus according to claim 1 or 2, wherein said holding energizing circuit starts energizing on detecting that speed electromotive force in said fixed coil has become substantially zero.

16. Electromagnetic rotating apparatus according to claim 2, wherein said damping circuit feeds a damping current to said fixed coil in accordance with speed electromotive force therein, and said holding energizing circuit starts energizing on detecting that said speed electromotive force in said fixed coil has become substantially zero.

* * * * *